(12) United States Patent
Kim et al.

(10) Patent No.: US 12,098,252 B2
(45) Date of Patent: Sep. 24, 2024

(54) METHOD FOR PREPARING HYDROGEL AND ENERGY STORAGE DEVICE INCLUDING THE SAME

(71) Applicant: RESEARCH & BUSINESS FOUNDATION SUNGKYUNKWAN UNIVERSITY, Suwon-si (KR)

(72) Inventors: Jae Yun Kim, Suwon-si (KR); Donghwan Ji, Suwon-si (KR)

(73) Assignee: Research & Business Foundation Sungkyunkwan University, Suwon-si (KR)

(*) Notice: Subject to any disclaimer, the term of this patent is extended or adjusted under 35 U.S.C. 154(b) by 154 days.

(21) Appl. No.: 17/700,758

(22) Filed: Mar. 22, 2022

(65) Prior Publication Data

US 2023/0068334 A1    Mar. 2, 2023

(30) Foreign Application Priority Data

Aug. 24, 2021   (KR) .................. 10-2021-0111416

(51) Int. Cl.
*C08J 3/075* (2006.01)
*B01J 13/00* (2006.01)
(Continued)

(52) U.S. Cl.
CPC ........... *C08J 3/075* (2013.01); *B01J 13/0056* (2013.01); *B01J 13/0065* (2013.01);
(Continued)

(58) Field of Classification Search
CPC .... C08J 3/075; C08J 2357/10; B01J 13/0056; B01J 13/0065; B01J 13/0069; C08G 61/126; C08G 2210/00; C08G 2261/3247; C08G 2261/516; C08G 2261/76; C08G 2261/90; C08K 3/22; C08K 3/26; C08K 2003/2227; C08K 2003/265
See application file for complete search history.

(56) References Cited

U.S. PATENT DOCUMENTS

| 11,752,482 | B2 * | 9/2023 | Kim .................. A61L 27/52 524/437 |
| 2010/0055572 | A1 | 3/2010 | Park et al. |
| 2017/0203971 | A1 | 7/2017 | Sakatani et al. |

FOREIGN PATENT DOCUMENTS

| JP | 6405540 B2 | 10/2018 |
| KR | 10-2007-0108089 A | 11/2007 |

(Continued)

OTHER PUBLICATIONS

Kim et al ("Bioinspired Structural Composite Hydrogels with a Combination of High Strength, Stiffness, and Toughness", Adv. Funct. Mater.2021, 31, Apr. 28, 2021). (Year: 2021).*

(Continued)

*Primary Examiner* — Robert S Jones, Jr.
*Assistant Examiner* — Jiangtian Xu
(74) *Attorney, Agent, or Firm* — NSIP Law

(57) ABSTRACT

A method for preparing a hydrogel includes forming a pre-gel comprising polymer and metal salt particles, unidirectionally-shrinking and dehydrating the pre-gel, and impregnating the unidirectionally shrunk and dehydrated pre-gel with an ion solution to crosslink and rehydrate the unidirectionally shrunk and dehydrated pre-gel to produce the hydrogel.

14 Claims, 20 Drawing Sheets

(51) Int. Cl.
    *C08G 61/12*       (2006.01)
    *C08K 3/22*        (2006.01)
    *C08K 3/26*        (2006.01)

(52) U.S. Cl.
    CPC ........ *B01J 13/0069* (2013.01); *C08G 61/126* (2013.01); *C08K 3/22* (2013.01); *C08K 3/26* (2013.01); *C08G 2210/00* (2013.01); *C08G 2261/3247* (2013.01); *C08G 2261/516* (2013.01); *C08G 2261/76* (2013.01); *C08G 2261/90* (2013.01); *C08J 2357/10* (2013.01); *C08K 2003/2227* (2013.01); *C08K 2003/265* (2013.01)

(56) References Cited

FOREIGN PATENT DOCUMENTS

| KR | 10-1881249 B1 | 7/2018 |
| KR | 10-2358445 B1 | 2/2022 |

OTHER PUBLICATIONS

Li et al ("Hybrid Hydrogels with Extremely High Stiffness and Toughness", ACS Macro Lett. 2014, 3, 520-523). (Year: 2014).*
Korean Office Action issued on Mar. 14, 2023, in counterpart Korean Patent Application No. 10-2021-0111416 (6 pages in English, 6 pages in Korean).

* cited by examiner

Example 1

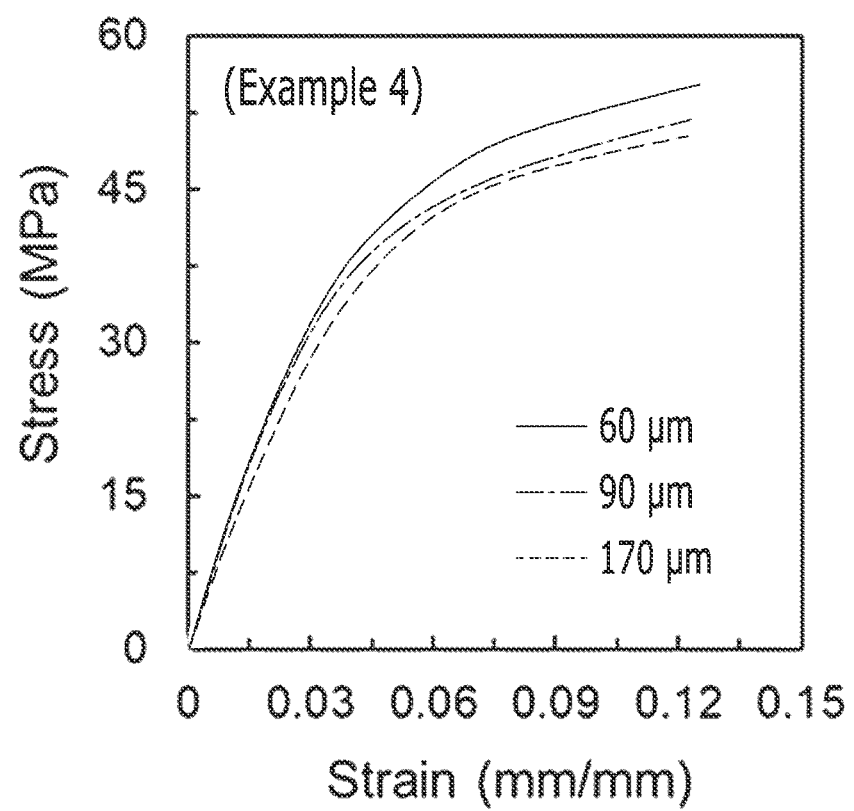

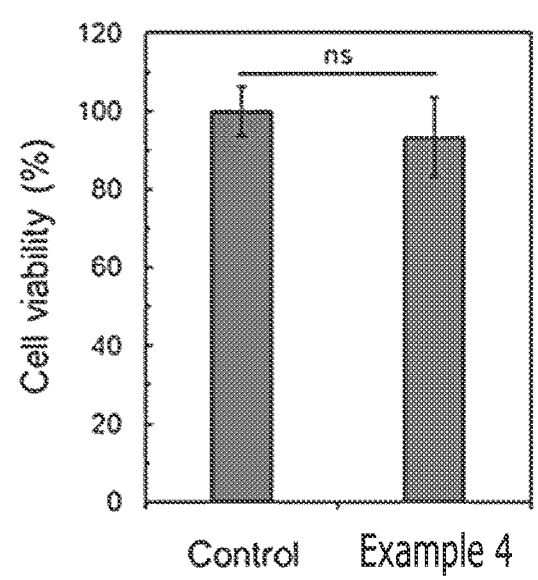

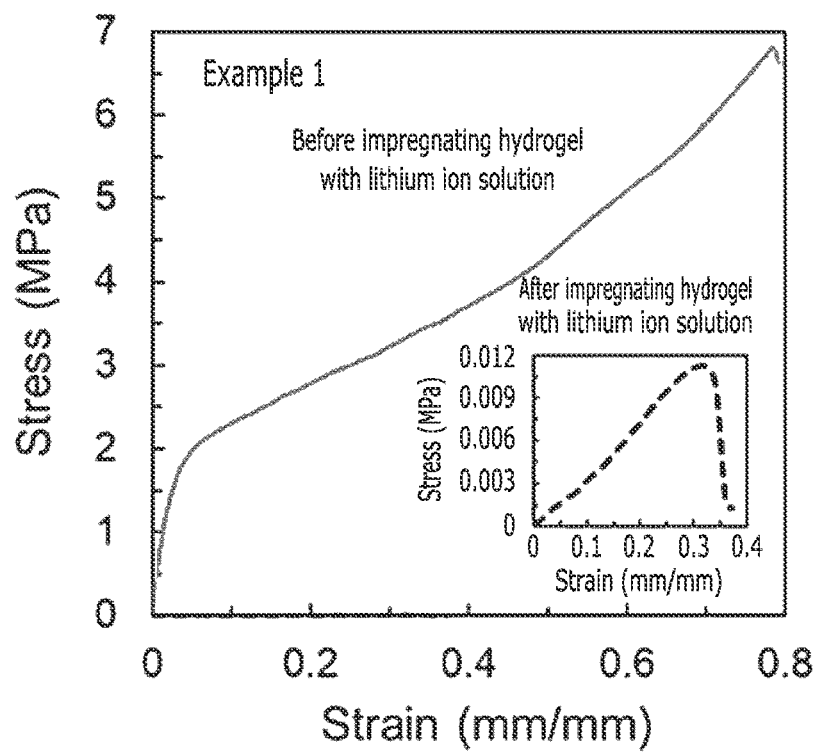

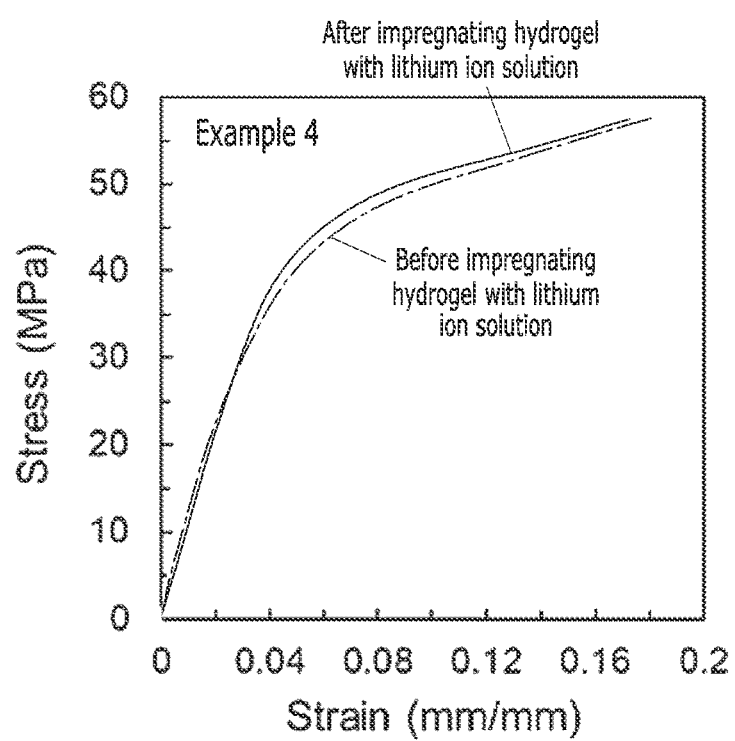

FIG.13
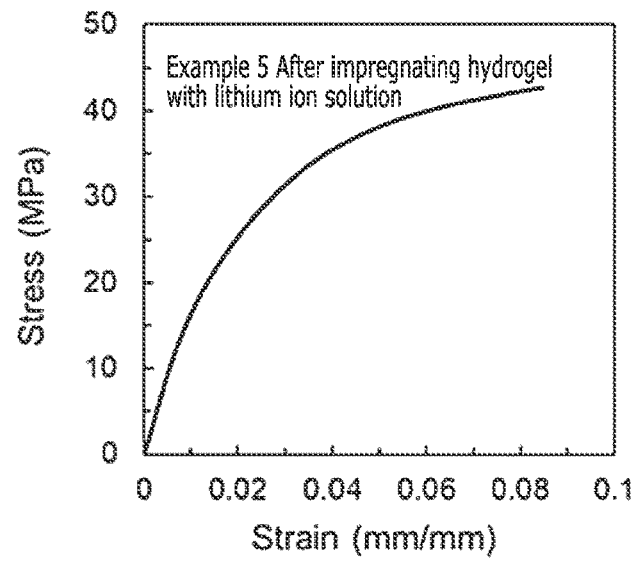
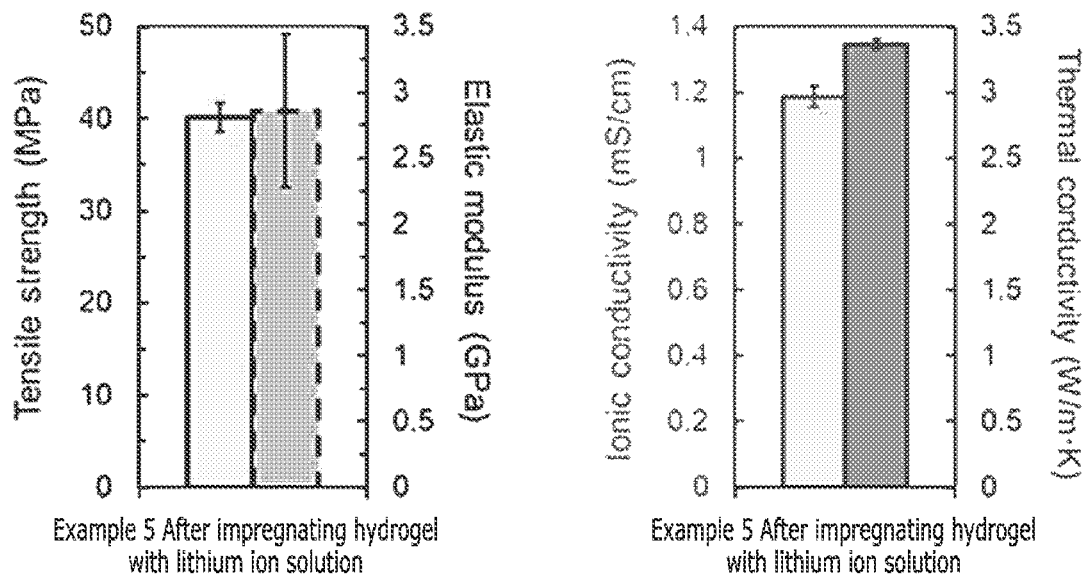

METHOD FOR PREPARING HYDROGEL AND ENERGY STORAGE DEVICE INCLUDING THE SAME

CROSS-REFERENCE TO RELATED APPLICATIONS

This application claims the benefit under 35 USC 119(a) of Korean Patent Application No. 10-2021-0111416 filed on Aug. 24, 2021, in the Korean Intellectual Property Office, the entire disclosure of which is incorporated herein by reference for all purposes.

BACKGROUND

1. Field

The present disclosure relates to a method for preparing a hydrogel and an energy storage device including the same.

2. Description of the Related Art

A hydrogel has a network structure in which water-soluble polymers are three-dimensionally crosslinked via physical (hydrogen bond, van der Waals force, hydrophobic interaction, or polymer crystal) or chemical bond (covalent bond). The hydrogel contains water to allow a sufficient number of ions to dissociate, and thus has excellent ionic conductivity. Unlike liquid, the ion conductive hydrogel may maintain its shape while not flowing and thus is attracting attention as a solid electrolyte of a next-generation energy storage device that replaces liquid electrolyte. Further, when mechanical properties of the hydrogel are similar to or greater than those of an existing separator, the hydrogel may act as both the solid electrolyte and the separator at the same time.

Each of the solid electrolyte and the separator requires an elastic modulus in an order of a minimum GPa, and high ionic conductivity at the same time. However, a conventional hydrogel has a very low elastic modulus, and thus does not act as the solid electrolyte and the separator. When the conventional hydrogel is impregnated with a lithium ion solution to increase lithium ion conductivity, the mechanical properties thereof further deteriorate.

An electrode of the energy storage device is composed of metal oxide, a conductive additive (conductive agent), and a binder. A conventional electrode uses a trace amount of nano- or micro-sized carbon-based particles as the conductive agent and uses a non-conductive polymer as the binder. Thus, the efficiency of the electrode is limited. Therefore, in order to solve this problem, attempts have been made to use a conductive polymer as each of the conductive agent and the binder.

Further, although many R&D efforts are being made to improve the mechanical properties of an alginic acid-based hydrogel, complex polymer synthesis, and large-area production processes are required. Further, there are still difficulties in achieving high mechanical properties thereof.

Therefore, there is a need for a method for preparing a hydrogel having excellent mechanical properties and conductivity and heat dissipation ability in a simple process.

Korean Patent Application Publication No. 10-2018-0113818 relates to a method for preparing a transparent silica hydrogel. The disclosed patent document discloses a method of improving the mechanical strength of the hydrogel by adding waterglass. However, effects related to other mechanical properties such as rigidity and fracture toughness are not disclosed. Thus, it may be considered that it is not sufficient to solve the above-mentioned problem.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method for preparing a hydrogel includes forming a pre-gel comprising polymer and metal salt particles, unidirectionally-shrinking and dehydrating the pre-gel, and impregnating the unidirectionally shrunk and dehydrated pre-gel with an ion solution to crosslink and rehydrate the unidirectionally shrunk and dehydrated pre-gel to produce the hydrogel.

The method may further include impregnating the hydrogel with another ion solution, different from the ion solution, causing ion exchange in the hydrogel.

The pre-gel may be formed of a single layer or multi-layers.

When the pre-gel is formed of the multi-layers, the multi-layers may be composed of different pre-gels layers alternately stacked with each other.

The pre-gel may have a low cross-link density due to the metal salt particles.

The polymer may include one selected from the group consisting of alginate (Alg), polyethylene glycol (PEG), chitosan, gelatin, polyacrylic acid (PAAc), polyacrylamide (PAM), poly(N-isopropylacrylamide) (PNIPAM), agar, poly (2-acrylamido-2-methylpropanesulfonic acid) (PAMPS), polyvinyl alcohol (PVA), and combinations thereof.

Each of the metal salt particles may include one selected from the group consisting of $CaSO_4$, $Ca(NO_3)_2$, $CaCl_2$, $CaS$, $CaCO_3$, and combinations thereof.

The ion solution may include ions selected from the group consisting of $Ba^{2+}$, $Ca^{2+}$, $Al^{3+}$, $Fe^{2+}$, $Fe^{3+}$, $Mg^{2+}$, $Cu^{2+}$, $Sr^{2+}$, $Co^{2+}$, $Mn^{2+}$, $Ni^{2+}$, $Sn^{2+}$, $Zn^{2+}$, $Ga^{3+}$, $Ti^{3+}$, $Na^+$, $K^+$, $Li^+$, and combinations thereof.

The method may further include performing treatment of a surface of the hydrogel, and adhering and laminating the surface treated hydrogel to and on another hydrogel.

The performing of the surface treatment may include impregnating the hydrogel with a solution comprising one selected from the group consisting of ethylenediaminetetraacetic acid (EDTA), chitosan, polylysine, aminopropyltriethoxysilane (APTES), hexamethylenediamine (HMDA), silica, polydopamine (PDA), tannic acid, and combinations thereof, or coating the solution onto the surface of the hydrogel.

The pre-gel further may include one selected from the group consisting of non-conductive inorganic particles, conductive inorganic particles, conductive polymer, and combinations thereof.

Each of the non-conductive inorganic particles may include one selected from the group consisting of aluminum oxide ($Al_2O_3$), boron nitride (BN), mica, illite, magnesium hydroxide ($Mg(OH)_2$), aluminum nitride (AlN), boron carbide ($B_4C$), Mg—Al-based layered double hydroxide, Ca—Al-based layered double hydroxide, Li—Al-based layered double hydroxide, and combinations thereof.

Each of the conductive inorganic particles may include one selected from the group consisting of active carbon, graphene, carbon fiber, and combinations thereof.

The conductive polymer may include one selected from the group consisting of poly(3,4-ethylenedioxythiophene) (PEDOT), polythiophene (PT), polypyrrole (PPy), polyaniline (PANI), polythiophene (PTh), poly(p-phenylene sulfide) (PPS), and combinations thereof.

The inorganic particles and the polymer may form a layered structure.

A hydrogel may be prepared by the method above.

An energy storage device may include the hydrogel above.

Other features and aspects will be apparent from the following detailed description, the drawings, and the claims.

BRIEF DESCRIPTION OF THE DRAWINGS

FIG. 9 is a graph measuring mechanical properties of a film-type hydrogel of a small thickness according to an Experimental Example of the present disclosure.

FIG. 10B thereof is a graph showing a result of measuring cell viability.

FIG. 11A and FIG. 11B are results of measuring the mechanical properties before and after impregnating a hydrogel according to one example of the present disclosure with a lithium ion solution, respectively.

FIG. 13 is a result of measuring mechanical properties after impregnating a hydrogel according to one example of the present disclosure with a lithium ion solution.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
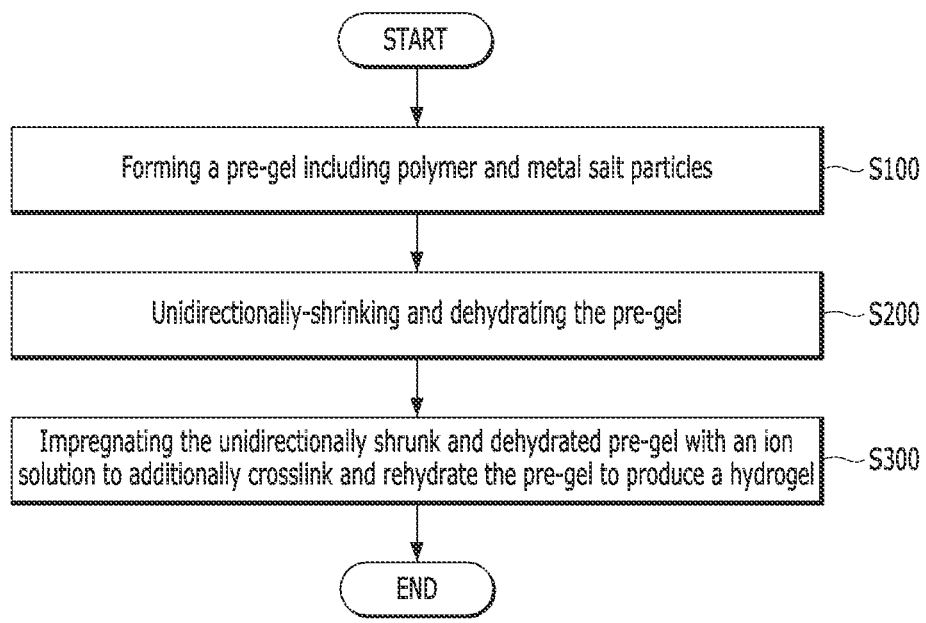
FIG. 1 is a flowchart of a method for preparing a hydrogel according to an implementation of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The terminology used herein is for the purpose of describing particular examples only and is not intended to limit the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entirety of list of elements and may not modify the individual elements of the list. When referring to "C to D", this means C inclusive to D inclusive unless otherwise specified.

As used herein, the term "substantially," "about," and similar terms are used as terms of approximation and not as terms of degree, and are intended to account for the inherent deviations in measured or calculated values that would be recognized by those of ordinary skill in the art. The term may be used to prevent unauthorized exploitation by an unauthorized infringer to design around accurate or absolute figures provided to help understand the present disclosure. Further, in the present disclosure, "step to" or "step of" does not mean "step for".

In addition, where features or aspects of the disclosure are described in terms of Markush groups, those skilled in the art will recognize that the disclosure is also thereby described in terms of any individual member or subgroup of members of the Markush group. Throughout the present disclosure, the term "combinations thereof" included in the expression of the Markush form means mixtures or combinations of at least one selected from the group consisting of components described in the expression of the Markush form.

Hereinafter, a method for preparing a hydrogel according to the present disclosure will be described in detail with reference to implementations and examples and drawings. However, the present disclosure is not limited to these implementations and examples and drawings.

The present disclosure is intended to solve the problem of the prior art as described above, and has the purpose of providing a method for preparing a hydrogel having excellent mechanical properties, ionic conductivity, electrical conductivity, and/or heat dissipation ability.

One purpose of the present disclosure is to provide a hydrogel prepared by the method for preparing the hydrogel, and an energy storage device including the hydrogel.

A conventional hydrogel has a very low modulus of elasticity. Thus, applying the conventional hydrogel to the solid electrolyte and the separator may be difficult. Furthermore, when impregnating the hydrogel with the lithium ion solution to increase lithium ion conductivity, the mechanical properties may deteriorate further.

On the contrary, the method for preparing the hydrogel according to the present disclosure may prepare a hydrogel having superior mechanical properties, ion conductivity and heat dissipation properties than those of the conventional hydrogel in a relatively simpler process of forming the pre-gel including the polymer and the metal salt particles, dehydrating the pre-gel in the unidirectionally shrunk manner, and then impregnating the same with the ion solution.

According to the present disclosure, the hydrogel may have a sufficient water content such that a large amount of ions is dissolved therein and thus have high ionic conductivity. In addition, the hydrogel may have the inorganic particles added thereto and thus may have superior rigidity and heat dissipation properties.

According to the present disclosure, the hydrogel may be applied to a solid electrolyte and a separator for energy storage devices such as all-solid-state lithium ion batteries and supercapacitors due to its high mechanical properties and heat dissipation properties to prevent internal short circuit and overheating. Thus, an energy storage device capable of stable operation may be achieved.

Further, according to the present disclosure, the hydrogel including the conductive polymer and/or conductive inorganic particles which are uniformly mixed with each other may be applied to an electrode and may be highly dense and thus have high conductivity/or capacitance per unit area.

Further, according to the present disclosure, the hydrogel has electrical conductivity, and thus may be used as a base material to replace a conductive additive and a binder used in the conventional electrode, thereby providing an electrode with improved efficiency compared to that of the conventional electrode.

Further, according to the present disclosure, the hydrogel may be prepared based on alginic acid as a biopolymer and may act as an eco-friendly material.

In order to achieve the above technical purposes, a first aspect of the present disclosure provides a method for preparing a hydrogel, the method including: forming a pre-gel including polymer and metal salt particles; unidirectionally-shrinking and dehydrating the pre-gel; and impregnating the unidirectionally shrunk and dehydrated pre-gel with an ion solution to additionally crosslink and rehydrate the pre-gel to produce the hydrogel.

A conventional hydrogel has a very low modulus of elasticity. Thus, applying the conventional hydrogel to the solid electrolyte and the separator is difficult. Furthermore, when impregnating the hydrogel with the lithium ion solution to increase lithium ion conductivity, the mechanical properties thereof further deteriorate. To solve this problem, many R&D efforts are being made to improve the mechanical properties of the hydrogels. However, complex polymer synthesis and large-area production processes are required. Further, it is still difficult to achieve high mechanical properties thereof.

On the contrary, the method for preparing the hydrogel according to the present disclosure may prepare the hydrogel having superior mechanical properties, ion conductivity and heat dissipation properties than those of the conventional hydrogel in a simple process of forming the pre-gel including the polymer and the metal salt particles, dehydrating the pre-gel in the unidirectionally shrunk manner, and then impregnating the same with the ion solution.

Further, according to the present disclosure, the hydrogel may have a sufficient water content such that a large amount of ions is dissolved therein and thus have high ionic conductivity. The hydrogel may have the inorganic particles added thereto and thus may have superior rigidity and heat dissipation properties.

Further, according to the present disclosure, the hydrogel may be applied to a solid electrolyte and a separator for energy storage devices such as all-solid-state lithium ion batteries and supercapacitors due to its high mechanical properties and heat dissipation properties to prevent internal short circuit and overheating. Thus, an energy storage device capable of stable operation may be achieved.

Further, according to the present disclosure, the hydrogel including the conductive polymer and/or conductive inorganic particles which are uniformly mixed with each other may be applied to an electrode and may be highly dense and thus have high conductivity/or capacitance per unit area.

Further, the hydrogel according to the present disclosure has electrical conductivity, and thus may be used as a base material to replace a conductive additive and a binder used in the conventional electrode, thereby providing an electrode having improved efficiency compared to that of the conventional electrode.

Further, according to the present disclosure, the hydrogel may be prepared based on alginic acid as a biopolymer and may act as an eco-friendly material.

FIG. 1 is a flowchart of a method for preparing a hydrogel according to an implementation of the present disclosure.

First, a pre-gel including polymer and metal salt particles is formed in S100.

According to one implementation of the present disclosure, the polymer may include one selected from the group consisting of alginate (Alg), polyethylene glycol (PEG), chitosan, gelatin, polyacrylic acid (PAAc), polyacrylamide (PAM), poly(N-isopropylacrylamide) (PNIPAM), agar, poly (2-acrylamido-2-methylpropanesulfonic acid) (PAMPS), polyvinyl alcohol (PVA) and combinations thereof. However, the present disclosure is not limited thereto.

In one implementation of the present disclosure, each of the metal salt particles may include one selected from the group consisting of $CaSO_4$, $Ca(NO_3)_2$, $CaCl_2$, CaS, $CaCO_3$ and combinations thereof. However, the present disclosure is not limited thereto.

In one implementation of the present disclosure, the pre-gel may have a low cross-link density due to the metal salt particles. However, the present disclosure is not limited thereto.

The low-density cross-linking means a weakly cross-linked state at a low cross-link density due to metal ions present in the metal salt particles, and refers to a state in which the mechanical properties are weak. Due to the rapid increase in viscosity when the metal salt particles are added to the polymer, there are obvious experimental/technical limitations in manufacturing a high-density hydrogel from the beginning. As will be described later, the dehydration of the low-density cross-linked pre-gel in the unidirectional shrunk manner is performed and then, impregnating the pre-gel with the ion solution is performed for additional cross-linking and rehydration thereof to prepare a hydrogel having an ultra-high cross-linking density and thus having excellent mechanical properties.

According to one implementation of the present disclosure, the pre-gel may further include one selected from the group consisting of non-conductive inorganic particles, conductive inorganic particles, conductive polymer, and combinations thereof. However, the present disclosure is not limited thereto.

When the pre-gel further includes one selected from the group consisting of non-conductive inorganic particles, conductive inorganic particles, conductive polymer, and combinations thereof, rigidity and heat dissipation properties of the hydrogel may be improved, and conductivity of the hydrogel may be controlled. However, the present disclosure is not limited thereto.

In one implementation of the present disclosure, each of the non-conductive inorganic particles may include one selected from the group consisting of aluminum oxide ($Al_2O_3$), boron nitride (BN), mica, illite, magnesium hydroxide ($Mg(OH)_2$), aluminum nitride (AlN), boron carbide ($B_4C$), Mg—Al-based layered double hydroxide, Ca—Al-based layered double hydroxide, Li—Al-based layered double hydroxide, and combinations thereof. However, the present disclosure is not limited thereto.

In one implementation of the present disclosure, each of the conductive inorganic particles may include one selected from the group consisting of active carbon, graphene, carbon fiber, and combinations thereof. However, the present disclosure is not limited thereto.

In one implementation of the present disclosure, the conductive polymer may include one selected from the group consisting of poly(3,4-ethylenedioxythiophene) (PEDOT), polythiophene (PT), polypyrrole (PPy), polyaniline (PANI), polythiophene (PTh), poly(p-phenylene sulfide) (PPS), and combinations thereof. However, the present disclosure is not limited thereto.

In one implementation of the present disclosure, the pre-gel may be formed in a single layer or multi-layers. However, the present disclosure is not limited thereto.

For example, the pre-gel may be only formed in the single layer. Alternatively, the pre-gel may be formed in the multi-layers which are respectively composed of different pre-gels made of different components and are stacked with each other. However, the present disclosure is not limited thereto.

As described above, the pre-gel may further include one selected from the group consisting of non-conductive inorganic particles, conductive inorganic particles, conductive polymer, and combinations thereof. Thus, the electrical conductivity of the hydrogel may be controlled.

For example, when the pre-gel includes the non-conductive inorganic particles in the formation of the pre-gel, the hydrogel as prepared may have non-conductivity, and thus may be applied to a solid electrolyte and a separator. On the other hand, when the pre-gel includes the conductive inorganic particles and/or the conductive polymer in the formation of the pre-gel, the hydrogel as prepared may have conductivity, and thus may be applied to an electrode. However, the present disclosure is not limited thereto.

In one implementation of the present disclosure, when the pre-gel is formed in the multi-layers, the multi-layers are respectively composed of different pre-gels made of different components and alternately stacked with each other. However, the present disclosure is not limited thereto.

For example, when the pre-gel is multi-layered, a pre-gel including the non-conductive inorganic particles and a pre-gel including the conductive inorganic particles and/or the conductive polymer may be alternately stacked with each other to constitute the multi-layers. However, the present disclosure is not limited thereto.

Thereafter, the pre-gel is unidirectionally shrunk and dehydrated in S200.

According to the present disclosure, the unidirectional shrinkage and dehydration may allow a top face of the hydrogel to be uniformly dried and only a thickness (height) of the hydrogel to be reduced. Thus, the density of the hydrogel is increased while the polymer network and the inorganic particles are uniformly mixed with each other inside the hydrogel. This has the effect of improving the mechanical properties thereof.

According to one implementation of the present disclosure, the inorganic particles and the polymer may form a layered structure. However, the present disclosure is not limited thereto.

When the inorganic particles and the polymer form the layered structure, much superior mechanical property strengthening effect compared to that in a structure in which the inorganic particles are simply arranged disorderly may be achieved.

Thereafter, the unidirectionally shrunk and dehydrated pre-gel may be impregnated with the ion solution such that the pre-gel is additionally crosslinked and rehydrated to form the hydrogel in S300.

The rehydration means that impregnating the unidirectionally shrunk and dehydrated pre-gel in a form of a thin sheet that does not contain moisture with the ion solution may allow the unidirectionally shrunk and dehydrated pre-gel to absorb the moisture and to be converted to the hydrogel.

The additional crosslinking means that impregnating the unidirectionally shrunk and dehydrated pre-gel with the ion solution may allow an additional crosslinking to be formed inside the pre-gel under action of a crosslinking agent included in the ion solution.

As described above, since the unidirectionally shrunk and dehydrated pre-gel is in a low-density cross-linked state, mechanical properties thereof are weak. However, performing the additional crosslinking may allow the number of cross-links in the gel to rapidly increase to form the hydrogel with improved mechanical properties. However, the present disclosure is not limited thereto.

In one implementation of the present disclosure, the method may further include impregnating the hydrogel with a further ion solution different from the ion solution such that ion exchange occurs in the hydrogel. However, the present disclosure is not limited thereto.

Figure 2:
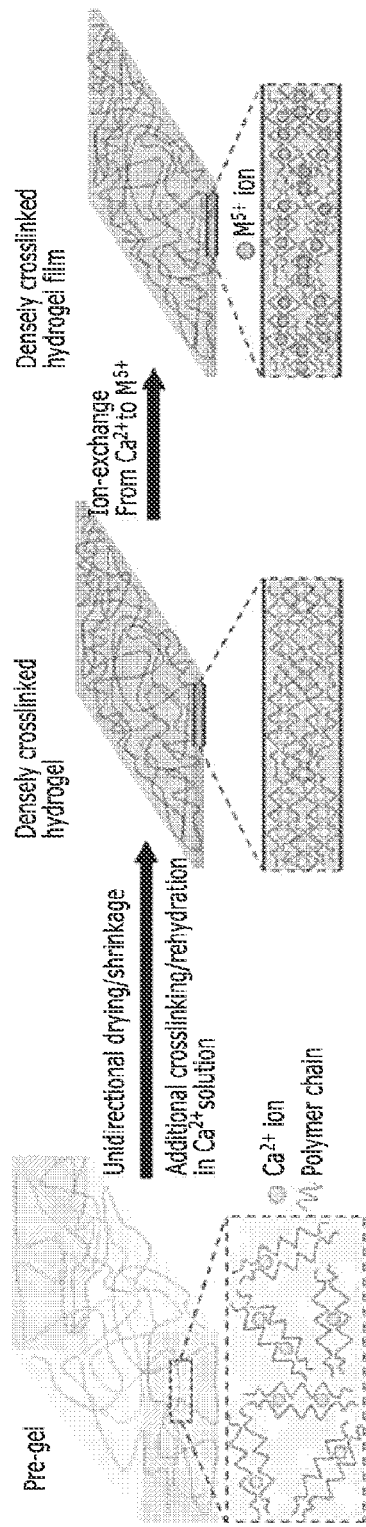
FIG. 2 is a schematic diagram of a method for preparing a hydrogel according to an implementation of the present disclosure.

FIG. 2 is a schematic diagram of a method for preparing a hydrogel according to an implementation of the present disclosure.

Referring to FIG. 2, after the unidirectionally shrunk and dehydrated pre-gel is impregnated with the ion solution such that the pre-gel is additionally crosslinked and rehydrated to form the hydrogel, the hydrogel may be impregnated with a different ion solution such that ions in the hydrogel cross-linked with the polymer are exchanged with different ions.

For example, a hydrogel in which $Ca^{2+}$ cross-link is formed is produced by impregnating the pre-gel with a $CaCl_2$) ion solution. Then, the prepared hydrogel is impregnated with an ion solution such as $BaCl_2$, $AlCl_3$, or $FeCl_3$ ion solution such that the ion exchange occurs. Due to the ion exchange, the $Ca^{2+}$ cross-link may be converted to $Ba^{2+}$, $Al^{3+}$, or $Fe^{3+}$ cross-link such that the crosslinking force may increase. However, the present disclosure is not limited thereto.

In one implementation of the present disclosure, the ion solution may include ions selected from the group consisting of $Ba^{2+}$, $Ca^{2+}$, $Al^{3+}$, $Fe^{2+}$, $Fe^{3+}$, $Mg^{2+}$, $Cu^{2+}$, $Sr^{2+}$, $Co^{2+}$, $Mn^{2+}$, $Ni^{2+}$, $Sn^{2+}$, $Zn^{2+}$, $Ga^{3+}$, $Ti^{3+}$, $Na^+$, $K^+$, $Li^+$, and combinations thereof. However, the present disclosure is not limited thereto.

In one implementation of the present disclosure, the method further includes performing treatment of a surface of the hydrogel, and adhering and laminating the surface treated hydrogel to and on an additional hydrogel. However, the present disclosure is not limited thereto.

The additional hydrogel may be used to obtain a hydrogel having a desired thickness. At least one hydrogels may be laminated onto each other. However, the disclosure is not limited thereto.

In the method for preparing the hydrogel according to the present disclosure, after the unidirectionally shrunk and dehydrated pre-gel is impregnated with the ion solution such that the pre-gel is additionally crosslinked and rehydrated to form the hydrogel in S300, or after the hydrogel is impregnated with an ion solution different from the above-described ion solution are exchanged with different ions, the method may include performing the treatment of the surface of the hydrogel and adhering and laminating the surface treated hydrogel to and on the additional hydrogel. In this way, the hydrogel of a desired thickness may be prepared without the use of an adhesive.

In one implementation of the present disclosure, the performing of the surface treatment may include impregnating the hydrogel with a solution including one selected from the group consisting of ethylenediaminetetraacetic acid (EDTA), chitosan, polylysine, aminopropyltriethoxysilane (APTES), hexamethylenediamine (HMDA), silica, polydopamine (PDA), tannic acid, and combinations thereof, or coating the solution onto the surface of the hydrogel. However, the present disclosure is not limited thereto.

Figure 3:
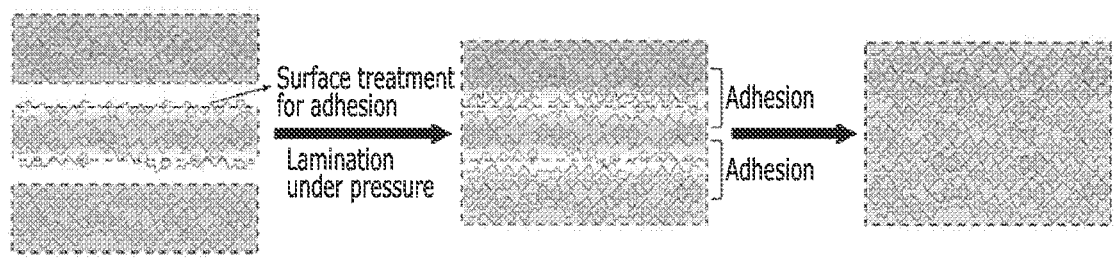
FIG. 3 is a schematic diagram of a process of lamination of a hydrogel according to one implementation of the present disclosure.

FIG. 3 is a schematic diagram of a process of lamination of the hydrogel according to one implementation of the present disclosure.

Referring to FIG. 3, it may be identified that the EDTA surface treatment breaks an ionic bond of the hydrogel surface, and that when the hydrogel whose the ionic bond is broken is attached to an additional hydrogel, re-coupling therebetween is made due to excess ions on the hydrogel surface.

On the contrary, when the surface treatment is performed using a solution containing chitosan, silica, polydopamine, etc., other than EDTA, hydrogel lamination may be achieved via electrostatic attraction, hydrogen bond, etc. without breaking the ionic bond.

Performing the surface treatment may allow the hydrogel lamination without the use of the adhesive such that a stack of the hydrogels has the desired thickness. Layer separation in the stack may not occur due to a strong adhesive force even when the stack of the hydrogels is bent.

Further, a second aspect of the present disclosure provides the hydrogel prepared by the method according to the first aspect of the present disclosure.

Detailed descriptions of the hydrogel of the second aspect of the present disclosure duplicate with those of the first aspect of the present disclosure are omitted. The omitted descriptions in the first aspect of the present disclosure may be equally applied to those of the second aspect of the present disclosure.

According to the present disclosure, the hydrogel may have a sufficient water content such that a large amount of ions is dissolved therein and thus have high ionic conductivity. The hydrogel may have the inorganic particles added thereto and thus may have superior rigidity and heat dissipation properties.

Further, according to the present disclosure, the hydrogel may act as a single solid electrolyte and a single separator or a single electrode depending on the components of the hydrogel. The electrode, the solid electrolyte, and the separator may be integrated into multiple layers.

Further, according to the present disclosure, the hydrogel including the conductive polymer and/or conductive inorganic particles which are uniformly mixed with each other may be applied to an electrode and may be highly dense and thus have high conductivity/or capacitance per unit area.

Further, the hydrogel according to the present disclosure has electrical conductivity, and thus may be used as a base material to replace a conductive additive and a binder used in the conventional electrode, thereby providing an electrode having improved efficiency compared to that of the conventional electrode.

Further, according to the present disclosure, the hydrogel may be prepared based on alginic acid as a biopolymer and may act as an eco-friendly material.

Further, a third aspect of the present disclosure provides an energy storage device including the hydrogel according to the second aspect of the present disclosure.

For example, the energy storage device may include a lithium ion secondary battery or a supercapacitor. However, the present disclosure is not limited thereto.

Detailed descriptions of the energy storage device of the third aspect of the present disclosure duplicate with those of the first aspect and/or the second aspect of the present disclosure are omitted. The omitted descriptions in the first and/or second aspect of the present disclosure may be equally applied to those of the third aspect of the present disclosure.

According to the present disclosure, the hydrogel may be applied to a solid electrolyte and a separator for energy storage devices such as lithium ion batteries and supercapacitors due to its high mechanical properties and heat dissipation properties prevent internal short circuit and overheating. Thus, an energy storage device capable of stable operation may be achieved.

Further, according to the present disclosure, the hydrogel having high electrical conductivity may be applied to an electrode, a conductive additive and/or a binder of an energy storage device such as a lithium ion secondary battery and a supercapacitor to produce an energy storage device with improved efficiency.

The above-described problem solving means are merely examples and should not be construed as limiting the present disclosure. In addition to the examples described above, additional examples may exist in the drawings and detailed description of the disclosure.

The present disclosure will be described in more detail through the following examples, but the following examples are only for the purpose of description and are not intended to limit the scope of the present disclosure.

[Present Example 1] Preparing Hydrogel

First, a mixed solution was prepared by mixing a trace amount of $CaSO_4$ particles with an alginic acid solution.

Then, the mixed solution was poured on a substrate to make it flat, and waiting for the $CaSO_4$ particles were completely ionized to prepare a low-density and weakly crosslinked $Ca^{2+}$ pre-gel.

Then, the pre-gel was unidirectionally shrunk and dehydrated on the flat substrate.

Finally, additional crosslinking and rehydration of the pre-gel were achieved by impregnating the unidirectionally shrunk and dehydrated pre-gel with a $CaCl_2$ ion solution, thereby preparing an ultra-high density and fully $Ca^{2+}$ crosslinked hydrogel film.

Figure 4:
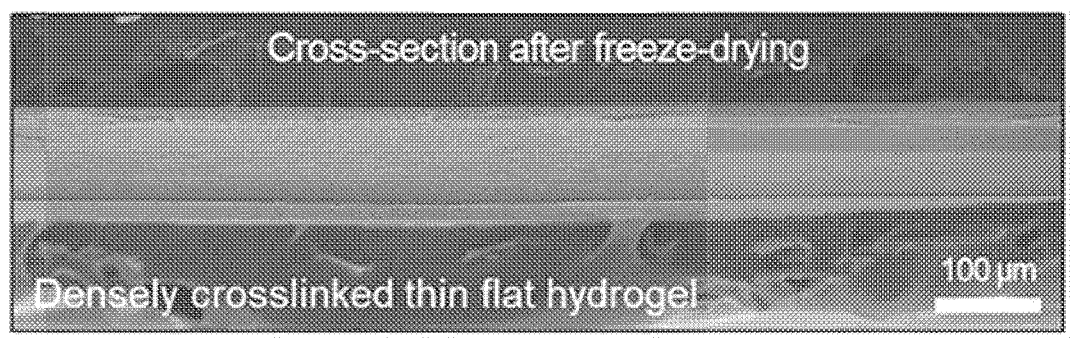
FIG. 4 is a cross-sectional SEM image of a hydrogel according to one example of the present disclosure.

FIG. 4 is a cross-sectional SEM image of a hydrogel according to one example of the present disclosure.

Referring to FIG. 4, it may be identified that Present Example 1 as unidirectionally shrunk and dehydrated has a high-density structure, and has ultra-high-density crosslinking, such that no pores are observed therein, and a thin and flat hydrogel is prepared.

[Present Example 2] Preparing Ion-Exchanged Hydrogel

We impregnated the hydrogel of Present Example 1 with a $BaCl_2$ ion solution to induce ion exchange. Thus, a $Ba^{2+}$ crosslinked hydrogel was prepared.

[Present Example 3] Preparing Ion-Exchanged Hydrogel

The hydrogel of Present Example 1 was impregnated with an $AlCl_3$ ion solution to induce ion exchange, thereby preparing an $Al^{3+}$ cross-linked hydrogel.

[Present Example 4] Preparing Ion-Exchanged Hydrogel

We impregnated the hydrogel of Present Example 1 with a $FeCl_3$ ion solution to induce ion exchange. Thus, a $Fe^{3+}$ crosslinked hydrogel was prepared.

[Present Example 5] Preparing Ion-Exchanged Hydrogel Including Non-Conductive Inorganic Particles A mixed solution was prepared by mixing a trace amount of $CaSO_4$ particles and plate-shaped alumina as a non-conductive inorganic particle with an alginic acid solution.

Then, the mixed solution was poured on a substrate to make it flat, and waiting for the $CaSO_4$ particles to be completely ionized to prepare a low-density, weakly crosslinked $Ca^{2+}$ pre-gel.

Then, the pre-gel was unidirectionally shrunk and dehydrated on the flat substrate.

Finally, additional crosslinking and rehydration of the pre-gel were achieved by impregnating the unidirectionally shrunk and dehydrated pre-gel with a $CaCl_2$ ion solution, thereby preparing an ultra-high density and fully $Ca^{2+}$ crosslinked hydrogel film.

Then, we impregnated the hydrogel film with a $FeCl_3$ ion solution to induce ion exchange. Thus, a $Fe^{3+}$ crosslinked hydrogel was prepared, including the inorganic particles.

[Present Example 6] Preparing Ion-Exchanged Hydrogel, Including a Conductive Polymer A mixed solution was prepared by mixing poly(3,4-ethylenedioxythiophene) (PEDOT) as a conductive polymer, and a trace amount of $CaSO_4$ particles with an alginic acid solution.

Then, the mixed solution was poured on a substrate to make it flat, and waiting for the $CaSO_4$ particles to be completely ionized to prepare a low-density, weakly crosslinked $Ca^{2+}$ pre-gel.

Then, the pre-gel was unidirectionally shrunk and dehydrated on the flat substrate.

Then, additional crosslinking and rehydration of the pre-gel were achieved by impregnating the unidirectionally shrunk and dehydrated pre-gel with a $CaCl_2$) ion solution, thereby preparing an ultra-high density and fully $Ca^{2+}$ crosslinked hydrogel film.

Then, we impregnated the hydrogel film with a $FeCl_3$ ion solution to induce ion exchange. Thus, a $Fe^{3+}$ crosslinked hydrogel was prepared, including the inorganic particles.

[Present Example 7] Preparing Hydrogel Composed of Laminated Multiple Layers Made of Different Components First, a pre-gel that may be converted to a hydrogel which may be used as an electrode and a pre-gel that may be converted to a hydrogel which may be used as each of an electrolyte and a separator were prepared, respectively.

The pre-gel, which may be converted to the hydrogel that may be used as the electrode, was prepared by mixing a trace amount of $CaSO_4$ particles and a conductive polymer poly (3,4-ethylenedioxythiophene) (PEDOT) with an alginic acid solution to prepare a mixed solution, and then pouring the mixed solution onto a substrate to make it flat, and waiting for the $CaSO_4$ particles to be completely ionized.

The pre-gel that may be converted to the hydrogel, which may be used as each of an electrolyte and a separator, was prepared by mixing a trace amount of $CaSO_4$ particles and plate-shaped alumina as a non-conductive inorganic particle with an alginic acid solution to prepare a mixed solution, and then pouring the mixed solution onto a substrate to make it flat, and waiting for the $CaSO_4$ particles to be completely ionized.

Then, the pre-gel that may be converted to the hydrogel may be used as each of an electrolyte, and a separator was placed on the pre-gel, which may be converted to the hydrogel that may be used as the electrode. Then, a further pre-gel which may be converted to the hydrogel which may be used as the electrode was placed on the pre-gel that may be converted to the hydrogel which may be used as each of an electrolyte and a separator. Thus, a pre-gel composed of laminated multiple layers was prepared.

Thereafter, the pre-gel composed of the laminated multiple layers was unidirectionally shrunk and dehydrated on a flat substrate.

Then, additional crosslinking and rehydration of the pre-gel were achieved by impregnating the unidirectionally shrunk and dehydrated pre-gel with a $CaCl_2$) ion solution, thereby preparing an ultra-high density and fully $Ca^{2+}$ crosslinked hydrogel film.

Then, we impregnated the hydrogel film with a $FeCl_3$ ion solution to induce ion exchange. Thus, a $Fe^{3+}$ crosslinked hydrogel composed of the laminated multiple layers made of different components was prepared.

Comparative Example 1

First, a mixed solution was prepared by mixing a trace amount of $CaSO_4$ particles with an alginic acid solution.

Then, the mixed solution was poured on a substrate to make it flat, and waiting for the $CaSO_4$ particles were completely ionized to prepare a low-density, and weakly crosslinked $Ca^{2+}$ pre-gel.

Comparative Example 2

The pre-gel of Comparative Example 1 was immediately impregnated with a $CaCl_2$) ion solution to prepare a hydrogel that was simply additionally crosslinked.

Comparative Example 3

First, an alginic acid solution was poured on a substrate to make it flat. Then, unidirectional shrinkage and dehydration were performed thereon to prepare an alginic acid film.

Then, the unidirectional shrunk and dehydrated alginic acid film was impregnated with a $CaCl_2$) solution to prepare a $Ca^{2+}$ cross-linked hydrogel.

Figure 5:
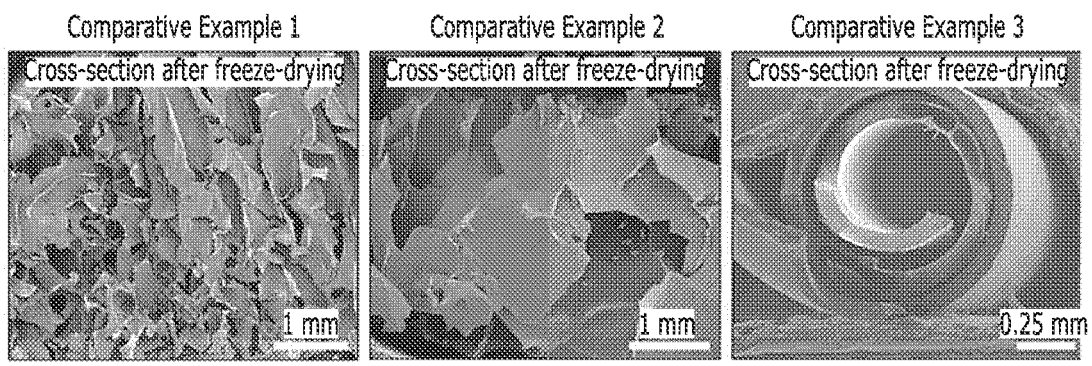
FIG. 5 is a cross-sectional SEM image of a hydrogel according to one Comparative Example of the present disclosure.

FIG. 5 is a cross-sectional SEM image of a hydrogel according to one Comparative Example of the present disclosure.

Referring to FIG. 5, it may be identified that Comparative Example 1 and Comparative Example 2 are not subjected to unidirectional shrinkage and dehydration, so that high-density crosslink and high-density polymer network are not formed, and a water content is very high, and many pores are observed therein after freeze-drying. It may be identified that in Comparative Example 3, which is subjected to unidirectional shrinkage and dehydration, a structure of a relatively high density is formed and pores are not visible, but the Comparative Example 3 is not flat and is rolled up spontaneously.

[Experimental Example 1] Lamination of Hydrogels

Figure 6:
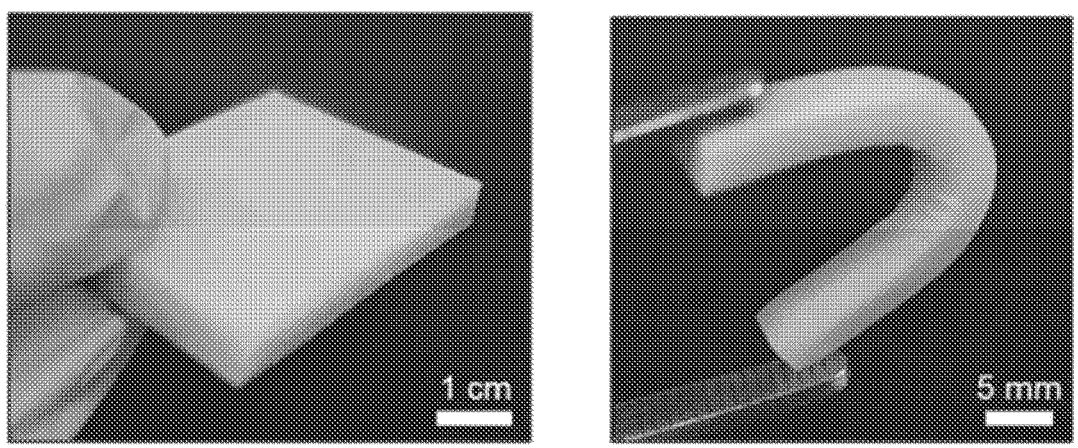
FIG. 6 is an image of hydrogels laminated via surface treatment of hydrogels according to one example of the present disclosure.

FIG. 6 is an image of hydrogels laminated via surface treatment of hydrogels according to one example of the present disclosure. Specifically, hydrogels were laminated such that a total thickness thereof was in a range of 1 cm and 5 mm.

Referring to FIG. 6, after preparing several hydrogels of Present Example 1, the surfaces of the hydrogels were treated with EDTA (ethylenediaminetetraacetic acid). Adjacent hydrogels were bonded to each other. Thus, a stack of hydrogels having various total thicknesses may be prepared. Further, it may be identified that the layer separation does not occur in the stack due to excellent adhesion when the stack was bent.

It may be identified based on Experimental Example 1 that a thick hydrogel having a desired thickness may be prepared.

[Experimental Example 2] Tensile Test of Hydrogel

Figure 7A:
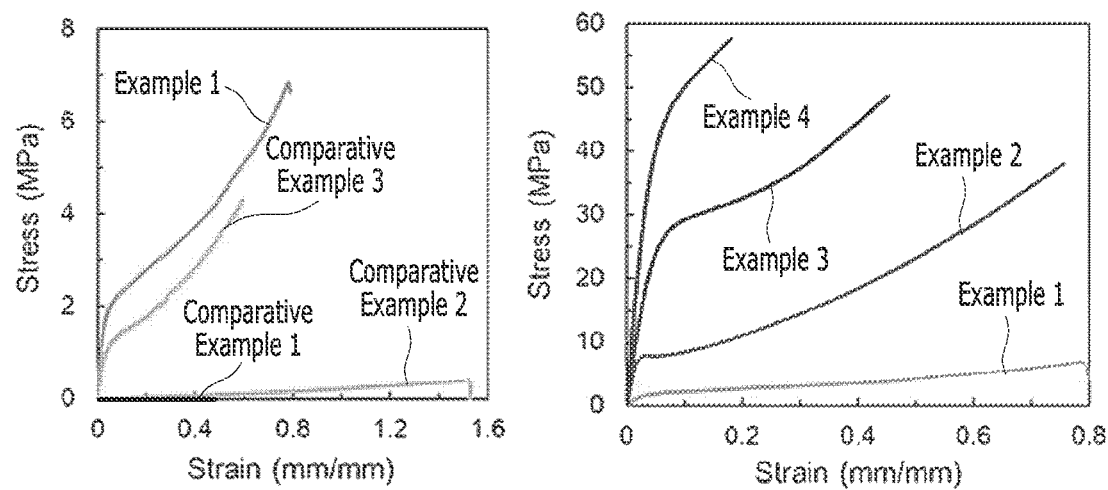
FIG. 7A is a graph showing results of measuring mechanical properties of hydrogels according to one example and Comparative Example of the present disclosure, respectively.
Figure 7B:
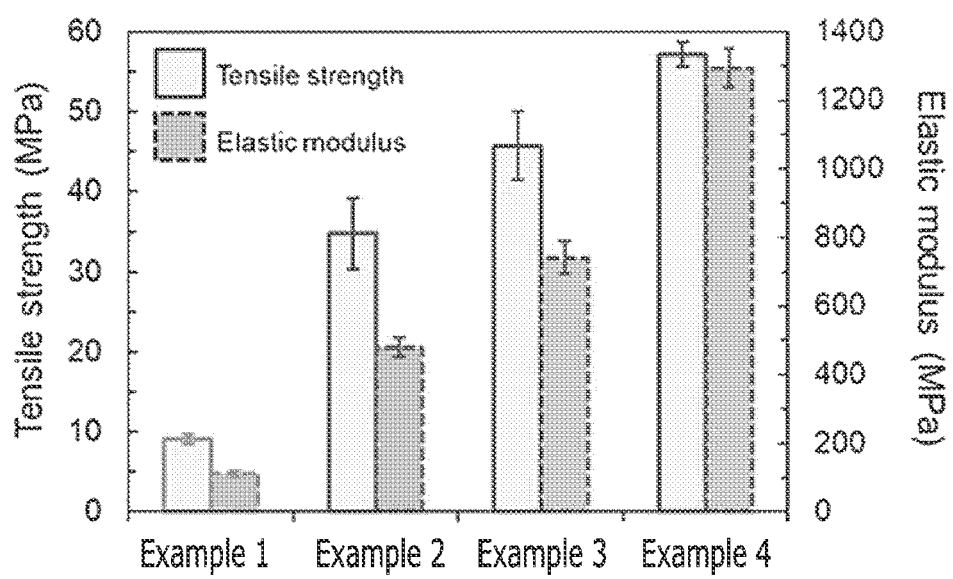
FIG. 7B is a graph showing results of measuring the mechanical properties of a hydrogel according to one example of the present disclosure.

FIG. 7A is a graph showing results of measuring mechanical properties of hydrogels according to one example and Comparative Example of the present disclosure, respectively. FIG. 7B is a graph showing results of measuring the mechanical properties of a hydrogel according to one example of the present disclosure.

Referring to FIGS. 7A and 7B, Comparative Example 1 and Comparative Example 2 are very weak compared to Present Example 1. Thus, in a stress-strain graph, stresses thereof are very insignificant. Comparative Example 3 has a relatively high-density structure, and thus has increased physical properties compared to Comparative Example 1 and Comparative Example 2. However, Comparative Example 3 still does not have the ultra-high density structure and high crosslinking density as in Present Example 1, so that each of the strength and the elastic modulus thereof is less than half of each of those of Present Example 1.

Further, it may be identified that in Present Example 1, and ion-exchanged Present Examples 2 to 4, the cross-linking force between ions and alginate chains increases as Example goes from Present Example 1 to Present Example 4, and that the stronger the cross-linking force, the higher the strength and the rigidity.

Present Example 4 had a tensile strength of 57 MPa and a tensile modulus of elasticity of 1,290 MPa, and exhibited very high mechanical properties, which have not been reported in conventional hydrogels.

[Experimental Example 3] Water Content of Hydrogel

Figure 8:
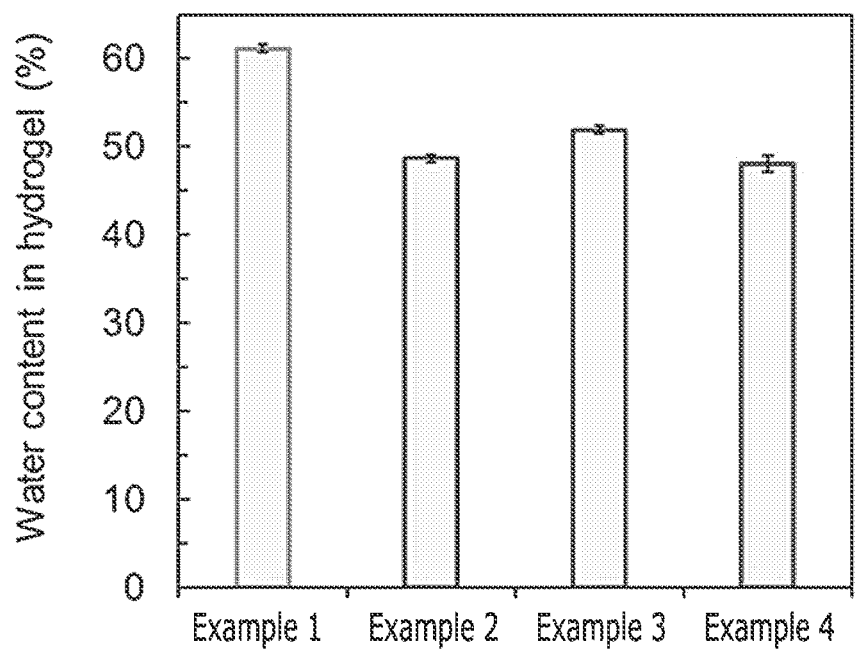
FIG. 8 is a graph measuring a water content of a hydrogel according to one example of the present disclosure.

FIG. 8 is a graph measuring a water content of a hydrogel according to one example of the present disclosure. A weight of the hydrogel in a wet state and a weight thereof after it was completely dried were measured, respectively. Thus, the water content was calculated based on a reduced weight therebetween.

Referring to FIG. 8, it may be identified that an actual water content has a value of 50% to 60% of a total weight of the hydrogel.

[Experimental Example 4] Mechanical Properties of Thin Film-Type Hydrogel

We controlled a thickness of the pre-gel in the method for preparing the hydrogel as in the Present Example 4. Thus, a hydrogel film having a thickness of each of 60 μm, 90 μm and 170 μm was prepared.

FIG. 9 is a graph measuring mechanical properties of a film-type hydrogel of a small thickness according to an Experimental Example of the present disclosure.

Referring to FIG. 9, it may be discerned that the thickness of the hydrogel is very thin while still excellent mechanical properties are observed in the hydrogel.

[Experimental Example 5] Cytotoxicity Test Results

Figure 10A:
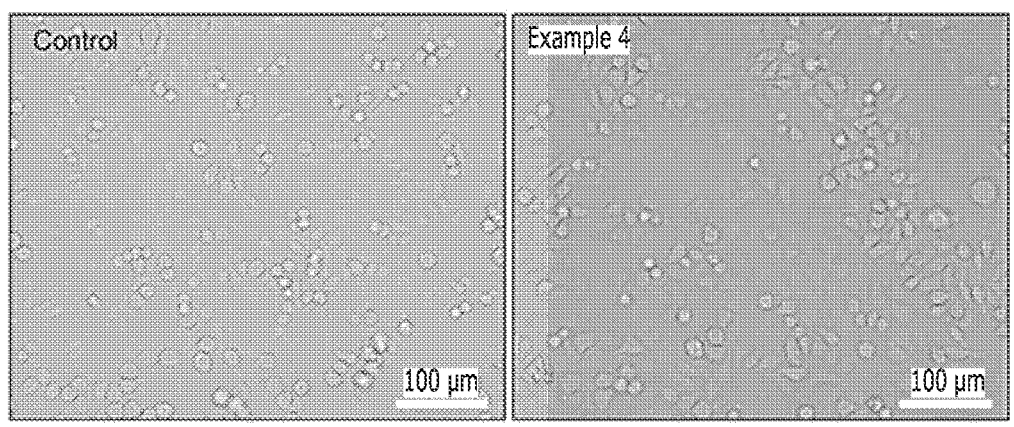
FIG. 10A is a microscope image observed after putting a hydrogel according to one example of the present disclosure into a cell medium for one day.

FIG. 10A is a microscope image observed after putting a hydrogel according to one example of the present disclosure into a cell medium for one day, and FIG. 10B thereof is a graph showing a result of measuring cell viability.

Referring to FIGS. 10A and 10B, when the hydrogel of Present Example 4 was put in a cell medium for one day, there was almost no apoptosis, so that cells were still well observed in the microscopic image. When the actual cell number was measured, there was little change thereof compared to that in a control group.

[Experimental Example 6] Measurement of Changes in Mechanical Properties of Hydrogel after Immersion of Hydrogel in Lithium Ion Solution A tensile test was performed after immersing the hydrogel of the present disclosure in a lithium ion high concentration (1M) solution to determine whether the hydrogel may be used as a gel electrolyte and a separator for energy storage devices such as lithium ion secondary batteries and super-capacitors.

Figure 11C:
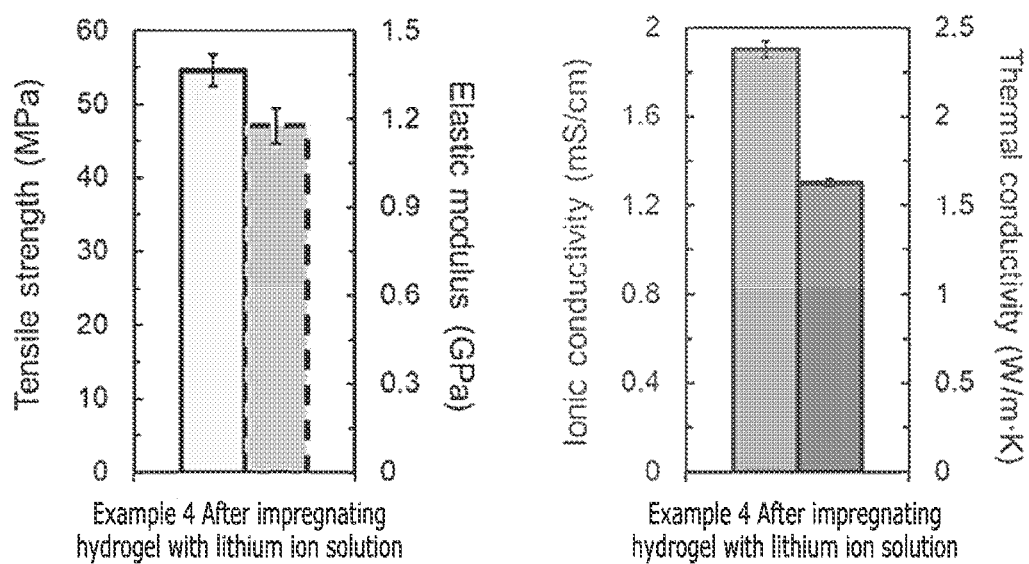
FIG. 11C thereof is a result of measuring mechanical properties after impregnating a hydrogel of one example of the present disclosure with the lithium ion solution.

FIG. 11A and FIG. 11B are results of measuring the mechanical properties before and after impregnating a hydrogel according to one example of the present disclosure with a lithium ion solution, respectively, and FIG. 11C thereof is a result of measuring mechanical properties after impregnating a hydrogel of one example of the present disclosure with the lithium ion solution. Specifically, a thermal conductivity of FIG. 11C was measured after the hydrogel was completely dried. This was because it was experimentally difficult to accurately measure the thermal conductivity of the wet hydrogel film without an error.

Referring to FIG. 11A, it may be identified that after impregnating the $Ca^{2+}$ cross-linked hydrogel of Present Example 1 with the lithium ion solution, the physical properties thereof are sharply deteriorated because the $Ca^{2+}$ cross-link is broken by $Li^+$.

On the contrary, referring to FIG. 11B and FIG. 11C, it may be identified that the $Fe^{3+}$ cross-linked hydrogel of Present Example 4 maintains its mechanical properties due to a very strongly cross-linked polymer network after impregnating the same with a high-concentration lithium ion solution. This is because, even after the hydrogel is impregnated with the lithium ion solution, the highly strongly crosslinked $Fe^{3+}$ polymer network is maintained. Further, since a sufficient amount of water is contained in the hydrogel, the ions are well dissociated therein, and accordingly, the hydrogel may have high ionic conductivity.

As a result, it is identified that even after impregnating the hydrogel of Present Example 4 with the lithium ion solution, the hydrogel has excellent properties of tensile strength of 55 MPa, tensile modulus of elasticity of 1.2 GPa, and ionic conductivity of 1.9 mS/cm.

[Experimental Example 7] Observation of Properties of Hydrogel Including Non-Conductive Inorganic Particles An experiment was performed to observe the properties of the hydrogel prepared according to Present Example 5.

Figure 12A:
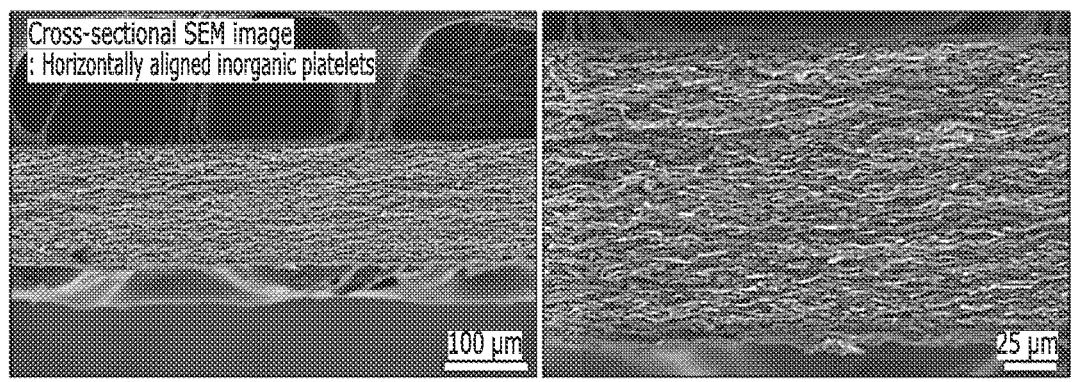
FIG. 12A is a cross-sectional SEM image of a hydrogel according to one example of the present disclosure.
Figure 12B:
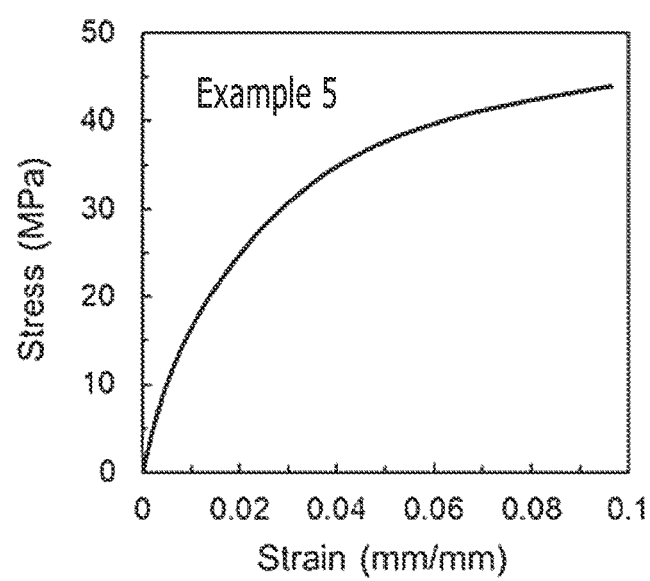
FIG. 12B is a result of measuring mechanical properties thereof.

FIG. 12A is a cross-sectional SEM image of a hydrogel according to one example of the present disclosure, and FIG. 12B is a result of measuring mechanical properties thereof.

Referring to FIGS. 12A and 12B, it may be identified that the plate-shaped inorganic particles are uniformly distributed and horizontally oriented in the hydrogel, and thus the hydrogel exhibits excellent mechanical properties.

Further, in order to determine whether the hydrogel may be used as a gel electrolyte and a separator for energy storage devices such as lithium ion secondary batteries and super-capacitors, a tensile test was performed after immersing the hydrogel of Present Example 5 with a lithium ion high concentration (1M) solution.

FIG. 13 is a result of measuring mechanical properties after impregnating a hydrogel according to one example of the present disclosure with a lithium ion solution.

Referring to FIG. 13, the hydrogel of Present Example 5 was immersed in a high concentration (1M) lithium ion solution and then the tensile test was performed. It may be identified that the hydrogel of Present Example 5 exhibits very high mechanical properties due to the inclusion of the inorganic particles in the very strongly $Fe^{3+}$ cross-linked polymer network. That is, the hydrogel of Present Example 5 has excellent properties of tensile strength of 47 MPa, and tensile modulus of elasticity of 2.0 GPa.

Further, since a sufficient amount of water is contained in the hydrogel, the ions are well dissociated therein, and accordingly, the hydrogel may have a high ionic conductivity of 1.2 mS/cm.

Further, it may be identified that since the inorganic plate-shaped alumina particles with high thermal conductivity are horizontally oriented, the hydrogel exhibits a high thermal conductivity which is 3.4 W/mK horizontal thermal conductivity. This value is two times or greater of a value of the hydrogel of Present Example 4 which is impregnated with the lithium ion solution. These properties are very excellent properties that have not been observed at all in conventional hydrogels or gel electrolytes.

[Experimental Example 7] Observation of Properties of Hydrogel Including Conductive Polymer and Conductive Inorganic Particles Added Thereto An experiment was performed to observe the mechanical properties of the hydrogel prepared according to Present Example 6.

Figure 14:
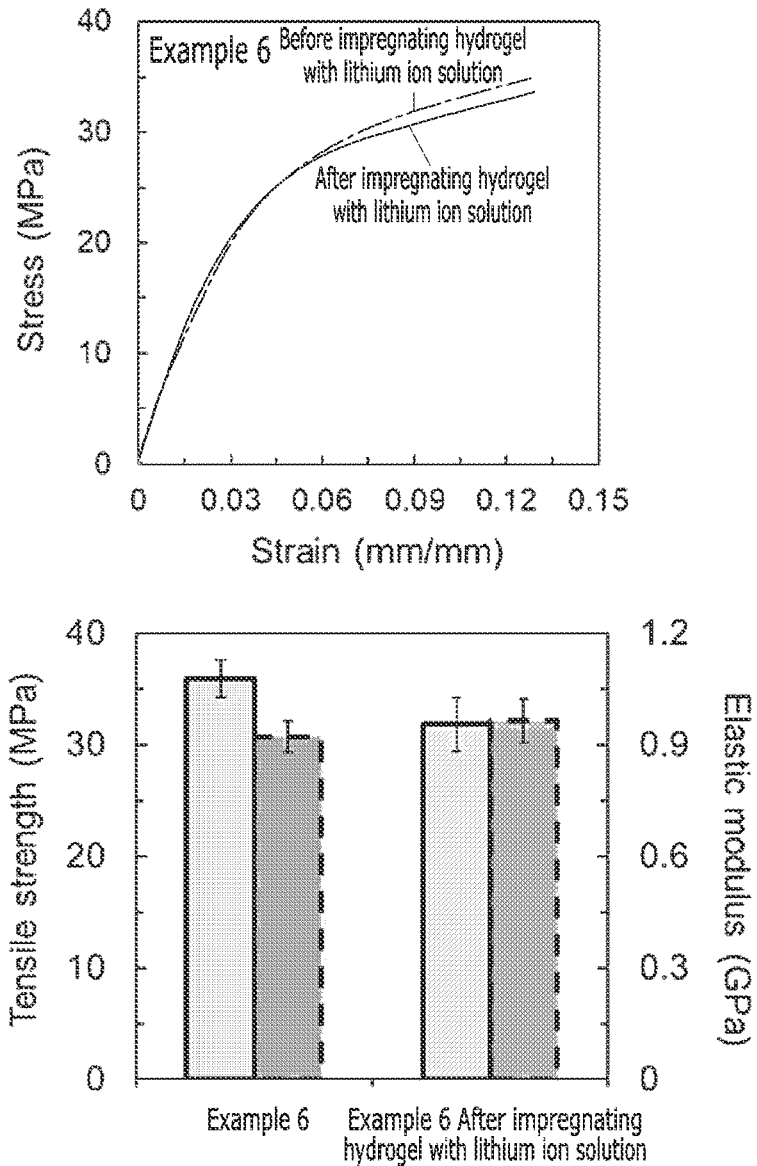
FIG. 14 is a result of measuring the mechanical properties of a hydrogel according to one example of the present disclosure.

FIG. 14 is the result of measuring the mechanical properties before and after impregnating the hydrogel according to one example of the present disclosure with a lithium ion high concentration (1M) solution.

Referring to FIG. 14, it may be discerned that the mechanical properties of the hydrogel are maintained due to the very strongly crosslinked polymer network after impregnating the hydrogel with a high concentration lithium ion solution. This is because, after impregnating the hydrogel with the lithium ion solution, the very strongly $Fe^{3+}$ crosslinked polymer network is maintained.

As a result, it may be identified that even after the hydrogel of Present Example 6 is impregnated with the lithium ion solution, the hydrogel has excellent properties of tensile strength of 32 MPa and tensile modulus of elasticity of 1.0 GPa.

[Experimental Example 8] Hydrogel Composed of Multiple Pre-Gel Layers

Figure 15:
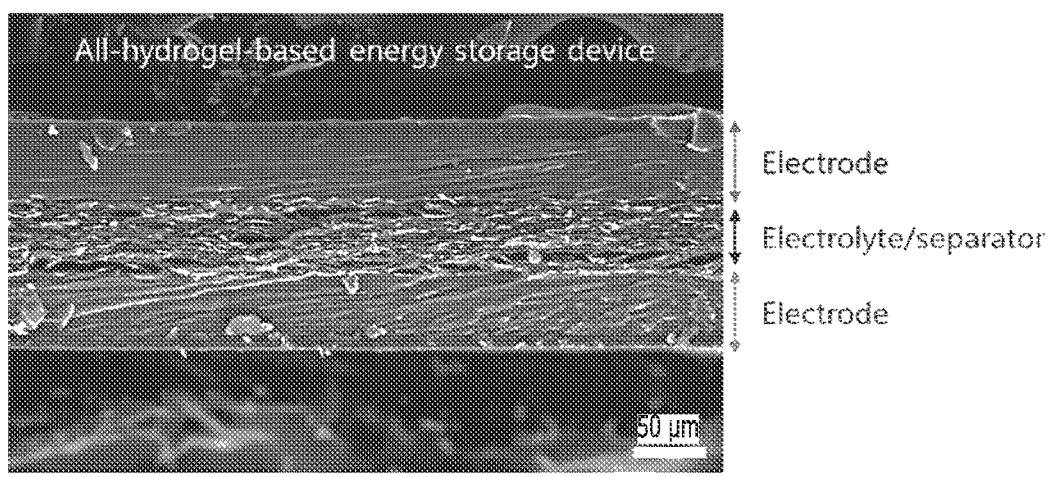
FIG. 15 is a cross-sectional SEM image of a hydrogel according to one example of the present disclosure.

FIG. 15 is a cross-sectional SEM image of a hydrogel according to Present Example 7 of the present disclosure.

Referring to FIG. 15, it may be identified that a conductive hydrogel layer that may be used as an electrode and a non-conductive hydrogel layer that may be used as each of a solid electrolyte and a separator are alternately stacked with each other. This structure may constitute a typical energy storage device composed of an electrode and an electrolyte/separator. It may be identified that when the layers are separated from each other, the layers may include Example 5 (electrolyte/separator) and Present Example 6 (electrode).

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method for preparing a hydrogel, the method comprising:
   forming a pre-gel comprising polymer and metal salt particles;
   unidirectionally-shrinking and dehydrating the pre-gel;
   impregnating the unidirectionally shrunk and dehydrated pre-gel with an ion solution to crosslink and rehydrate the unidirectionally shrunk and dehydrated pre-gel to produce the hydrogel; and
   impregnating the hydrogel with another ion solution, different from the ion solution, causing ion exchange in the hydrogel.

2. The method of claim 1, wherein the pre-gel is formed of a single layer or multi-layers.

3. The method of claim 2, wherein when the pre-gel is formed of the multi-layers, the multi-layers are composed of different pre-gel layers alternately stacked with each other.

4. The method of claim 1, wherein the pre-gel is crosslinked with a low-density compared to the hydrogel, due to the metal salt particles.

5. The method of claim 1, wherein the polymer comprises one selected from the group consisting of alginate (Alg), polyethylene glycol (PEG), chitosan, gelatin, polyacrylic acid (PAAc), polyacrylamide (PAM), poly(N-isopropylacrylamide) (PNIPAM), agar, poly(2-acrylamido-2-methylpropanesulfonic acid) (PAMPS), polyvinyl alcohol (PVA), and combinations thereof.

6. The method of claim 1, wherein each of the metal salt particles comprises one selected from the group consisting of $CaSO_4$, $Ca(NO_3)_2$, $CaCl_2$, CaS, $CaCO_3$, and combinations thereof.

7. The method of claim 1, wherein the ion solution comprises ions selected from the group consisting of $Ba^{2+}$, $Ca^{2+}$, $Al^{3+}$, $Fe^{2+}$, $Fe^{3+}$, $Mg^{2+}$, $Cu^{2+}$, $Sr^{2+}$, $Co^{2+}$, $Mn^{2+}$, $Ni^{2+}$, $Sn^{2+}$, $Zn^{2+}$, $Ga^{3+}$, $Ti^{3+}$, $Na^+$, $K^+$, $Li^+$, and combinations thereof.

8. The method of claim 1, further comprising performing treatment of a surface of the hydrogel, and adhering and laminating the surface treated hydrogel to and on another hydrogel.

9. The method of claim 8, wherein the performing of the surface treatment comprises
   impregnating the hydrogel with a solution comprising one selected from the group consisting of ethylenediaminetetraacetic acid (EDTA), chitosan, polylysine, aminopropyltriethoxysilane (APTES), hexamethylenediamine (HMDA), silica, polydopamine (PDA), tannic acid, and combinations thereof, or
   coating the solution comprising one selected from the group consisting of ethylenediaminetetraacetic acid (EDTA), chitosan, polylysine, aminopropyltriethoxysilane (APTES), hexamethylenediamine (HMDA), silica, polydopamine (PDA), tannic acid, and combinations thereof onto the surface of the hydrogel.

10. The method of claim 1, wherein the pre-gel further comprises one selected from the group consisting of non-conductive inorganic particles, conductive inorganic particles, conductive polymer, and combinations thereof.

11. The method of claim 10, wherein each of the non-conductive inorganic particles comprises one selected from the group consisting of aluminum oxide ($Al_2O_3$), boron nitride (BN), mica, illite, magnesium hydroxide ($Mg(OH)_2$), aluminum nitride (AlN), boron carbide ($B_4C$), Mg—Al-based layered double hydroxide, Ca—Al-based layered double hydroxide, Li—Al-based layered double hydroxide, and combinations thereof.

12. The method of claim 10, wherein each of the conductive inorganic particles comprises one selected from the group consisting of active carbon, graphene, carbon fiber, and combinations thereof.

13. The method of claim 10, wherein the conductive polymer comprises one selected from the group consisting of poly(3,4-ethylenedioxythiophene) (PEDOT), polythiophene (PT), polypyrrole (PPy), polyaniline (PANI), polythiophene (PTh), poly(p-phenylene sulfide) (PPS), and combinations thereof.

14. The method of claim 10, wherein the inorganic particles and the polymer form a layered structure.

\* \* \* \* \*